US012800023B2

(12) United States Patent
Sakurai

(10) Patent No.: US 12,800,023 B2
(45) Date of Patent: Nov. 17, 2026

(54) GEAR DEVICE WITH LUBRICANT CONDITION MONITORING

(71) Applicant: Nabtesco Corporation, Tokyo (JP)

(72) Inventor: Kazuhiko Sakurai, Tokyo (JP)

(73) Assignee: NABTESCO COPRORATION, Tokyo (JP)

( * ) Notice: Subject to any disclaimer, the term of this patent is extended or adjusted under 35 U.S.C. 154(b) by 0 days.

(21) Appl. No.: 18/890,122

(22) Filed: Sep. 19, 2024

(65) Prior Publication Data

US 2025/0137527 A1 May 1, 2025

(30) Foreign Application Priority Data

Nov. 1, 2023 (JP) ................................ 2023-187619

(51) Int. Cl.
*F16H 57/04* (2010.01)

(52) U.S. Cl.
CPC ..... *F16H 57/0435* (2013.01); *F16H 57/0447* (2013.01); *F16H 57/0449* (2013.01)

(58) Field of Classification Search
CPC ............. F16H 57/0435; F16H 57/0447; F16H 57/0449; F16H 57/0476
See application file for complete search history.

(56) References Cited

U.S. PATENT DOCUMENTS 6,694,285 B1 2/2004 Choe et al.
2008/0300746 A1* 12/2008 Dreier .................... F16H 57/01 701/31.4
2012/0241258 A1* 9/2012 Subramaniam ........... F16N 7/40 184/6.4
2014/0260229 A1* 9/2014 Long ........................ F01M 1/00 60/459
2019/0056026 A1* 2/2019 Dalum ...................... F16N 7/00
2021/0116016 A1* 4/2021 Mueller .................. F16N 29/02
2021/0181177 A1* 6/2021 Sakurai ............. G01N 15/0606
2022/0349466 A1* 11/2022 Gaully ............... F16H 57/0435

FOREIGN PATENT DOCUMENTS

| | | | |
|---|---|---|---|
| CN | 117662736 | A | 3/2024 |
| DE | 102006027436 | A1 | 12/2007 |
| JP | H04-249718 | A | 9/1992 |
| JP | 2008-286357 | A | 11/2008 |
| WO | 2014/168092 | A1 | 10/2014 |

OTHER PUBLICATIONS

Office Action dated Apr. 27, 2026, issued in corresponding German Patent Application No. 102024127545.6 with English translation (8 pgs.).

* cited by examiner

*Primary Examiner* — Minh Truong
(74) *Attorney, Agent, or Firm* — Pillsbury Winthrop Shaw Pittman, LLP

(57) ABSTRACT

A speed reducer relating to an embodiment includes: a case; a reduction mechanism housed inside the case along with a lubricant, the reduction mechanism including a plurality of gears configured to rotate when acted upon by power from outside the case; a measurement chamber in communication with interior and exterior spaces of the case, the measurement chamber being shut out from ambient air outside the case; a pressure sensor configured to detect pressure inside the measurement chamber; and a control unit configured to monitor a condition of the lubricant inside the case based on a detected result by the pressure sensor.

5 Claims, 3 Drawing Sheets

GEAR DEVICE WITH LUBRICANT CONDITION MONITORING

CROSS-REFERENCE TO RELATED APPLICATIONS

This application is based on and claims the benefit of priority from Japanese Patent Application Serial No. 2023-187619 (filed on Nov. 1, 2023), the contents of which are hereby incorporated by reference in their entirety.

TECHNICAL FIELD

The present disclosure relates to a gear device.

BACKGROUND

Known gear devices include speed reducers configured to reduce rotation of an electric motor or the like and output the reduced rotation. A speed reducer of this type has a case (casing), and a transmission mechanism housed in the case. The transmission mechanism includes a plurality of gears configured to rotate when acted upon by the rotation of the electric motor. The gears include, for example, an input shaft for transmitting the rotation of the electric motor, and an output shaft for reducing the rotation of the input shaft and outputting the reduced rotation. The case is filled with lubricant to lower the frictional resistance in the transmission mechanism and to prevent a rise in the temperature of the transmission mechanism. To prevent the lubricant from leaking, for example, from between the case and the output shaft, various sealing mechanisms have been proposed (see, for example, Japanese Patent Application Publication No. 2008-286357).

It is, however, difficult to completely prevent the lubricant from leaking out of the case. This makes it important to detect the lubricant leakage. For example, a tray or the like may be provided to receive the leaked lubricant, so that the lubricant accumulated in the tray or the like can be detected. In this case, however, the lubricant leakage can be hardly detected immediately or accurately. In addition, this detecting method requires a space to be left for the purpose of lubricant leakage detection. Here, if the lubricant inside the case is not in an appropriate condition, the lubricant may not be able to effectively lower the frictional resistance in the transmission mechanism or to prevent a rise in the temperature of the transmission mechanism.

SUMMARY

The present disclosure is intended to provide a gear device that is capable of monitoring the condition of the lubricant immediately and accurately and maintaining the lubricant in an appropriate condition without requiring an increase in size.

An aspect of the present disclosure provides a gear device including: a case; a transmission mechanism housed inside the case along with a lubricant, the transmission mechanism including a plurality of gears configured to rotate when acted upon by power from outside the case; a measurement chamber in communication with interior and exterior spaces of the case, the measurement chamber being shut out from ambient air outside the case; a pressure sensor configured to detect pressure inside the measurement chamber; and a control unit configured to monitor a condition of the lubricant inside the case based on a detected result by the pressure sensor.

For example, if the lubricant stored inside the case leaks, the pressure inside the case changes as much as the lubricant leaks. The measurement chamber is in communication with interior and exterior spaces of the case and shut out from ambient air outside the case. Therefore, by detecting the pressure in the measurement chamber, the control unit can determine whether the lubricant stored inside the case has leaked. The gear device can thus monitor the condition of the lubricant inside the case immediately and accurately. Based on the results of the monitoring, the gear device can maintain the condition of the lubricant, for example, the lubricant filling amount, at an appropriate level. The gear device requires no external large-scale measuring device, thereby avoiding an increase in size.

In the above implementation, the gear device may include a housing separate from the case, the housing defining the measurement chamber in communication with the interior space of the case.

In the above implementation, a portion of the case and the housing may define the measurement chamber.

In the above implementation, the gear device may include a temperature sensor disposed in the measurement chamber, the temperature sensor being configured to detect temperature of a site exposed to the measurement chamber. The control unit may detect leakage of the lubricant from the interior space of the case based on a detected result by the temperature sensor and a detected result by the pressure sensor.

In the above implementation, the control unit may include a table associating values of a temperature rise from a reference temperature at the site exposed to the measurement chamber with the pressure inside the measurement chamber. The control unit may compare the detected result by the temperature sensor and the detected result by the pressure sensor against the table to estimate a ratio of the lubricant to a total volume that is a sum of a volume of the interior space of the case and a volume of the measurement chamber, and determine whether a filling amount of the lubricant is at a proper level based on an estimated result.

The gear device relating to the present disclosure can monitor the condition of the lubricant in the case immediately and accurately. Based on the results of the monitoring, the gear device can maintain the condition of the lubricant, for example, the lubricant filling amount, at an appropriate level. The gear device requires no external large-scale measuring device, thereby avoiding an increase in size.

DESCRIPTION OF THE PREFERRED EMBODIMENTS

The following describes an embodiment of the present disclosure with reference to the drawings.

<Speed Reducer>

Figure 1:
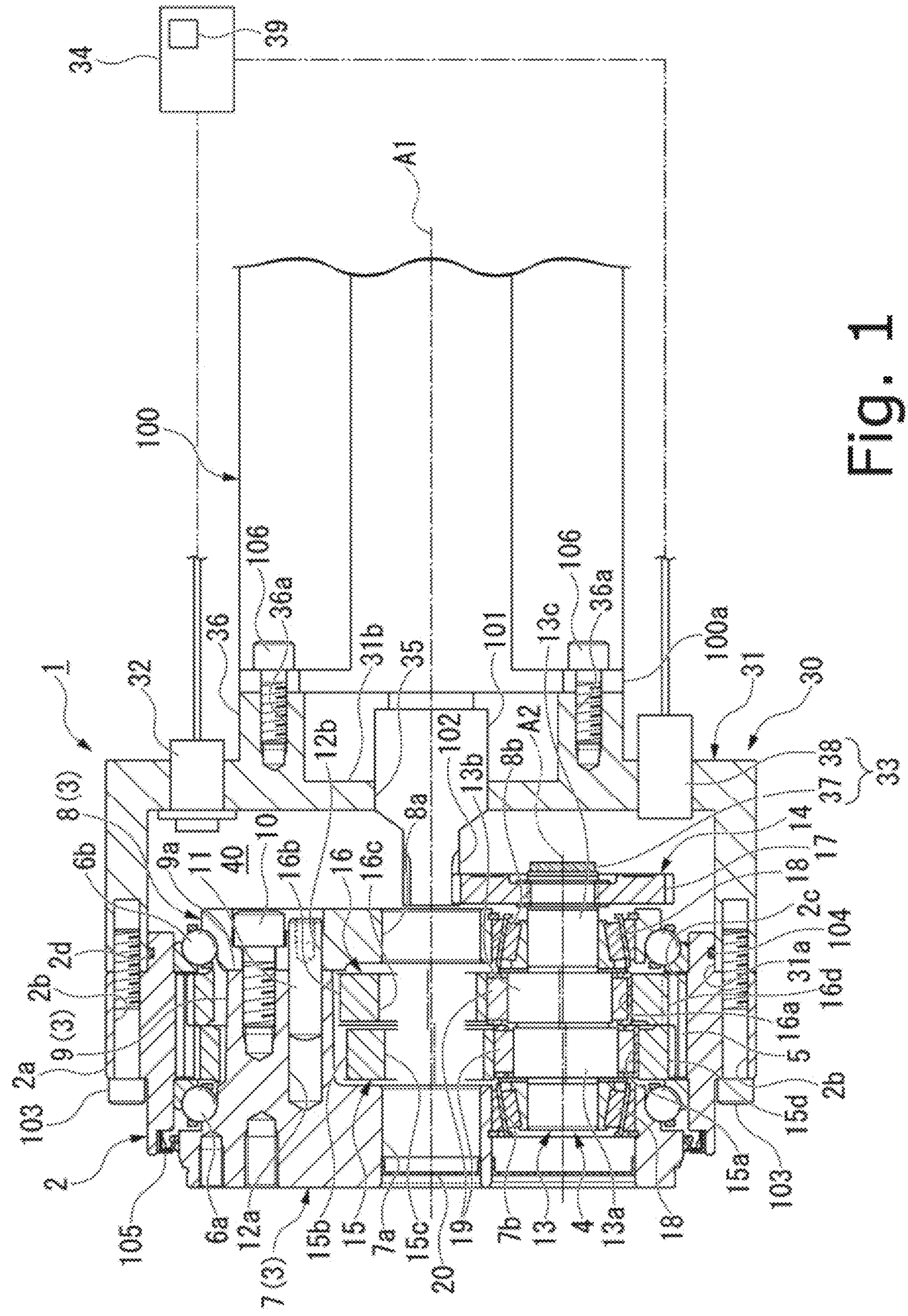
FIG. 1 is a sectional view of a speed reducer relating to an embodiment of the present disclosure.

FIG. 1 is a sectional view showing a speed reducer 1, which is a gear device. As shown in FIG. 1, the speed reducer 1 reduces rotation of an input shaft 101 and outputs the reduced rotation. The input shaft 101 is integrated with an electric motor 100. The speed reducer 1 is an eccentric oscillation speed reducer. The speed reducer 1 has a cylindrical case 2, a carrier 3 rotatably provided radially inside the case 2, a reduction mechanism 4 (an example of a transmission mechanism in the claims) coupled with the carrier 3, and a measuring device 30 attached to the case 2. The central axis of the case 2, the axis of rotation of the carrier 3, and the axis of rotation of the input shaft 101 of the electric motor 100 are coincident with each other.

In the following description, a common term "first rotation axis A1" is used to refer to the central axis of the case 2, the axis of rotation of the carrier 3, and the axis of rotation of the input shaft 101. The term "axial direction" represents the direction parallel to the first rotation axis A1. The term "circumferential direction" refers to the direction of rotation of the carrier 3. The term "radial direction" refers to the radial direction of case 2, which is orthogonal to the axial and circumferential directions. The speed reducer 1 and electric motor 100 are arranged next to each other in the axial direction.

<Case>

An outer flange 2*a* projects outwardly in the radial direction from the outer circumferential surface of the case 2. The outer flange 2*a* and the case 2 are shaped as a single component. The outer flange 2*a* has a plurality of bolt holes 2*b* into which bolts 103 are inserted. The bolt holes 2*b* are equally spaced in the circumferential direction. The measuring device 30 is secured to the case 2 by means of the bolts 103 inserted through the bolt holes 2*b* (described in detail below). The outer circumferential surface of the case 2 has an O-ring groove 2*d* extending along the entire circumference in a portion that is between the outer flange 2*a* and the electric motor 100. An O-ring 104 is placed in the O-ring groove 2*d*. The O-ring 104 seals between the case 2 and the measuring device 30 (see below for details).

The inner circumferential surface of the case 2 has a plurality of pin grooves 2*c* extending along the axial direction. The pin grooves 2*c* are equally spaced in the circumferential direction. Each pin groove 2*c* receives an internal tooth pin 5 fitted therein. The internal tooth pins 5 serve as internal teeth meshing with oscillating external gears 15 and 16 of the reduction mechanism 4, which will be described below. Main bearings 6*a* and 6*b* (first and second main bearings 6*a* and 6*b*, respectively) are provided on the inner circumferential surface of the case 2 at opposite ends in the axial direction. The carrier 3 is rotatably supported by the case 2 via the main bearings 6*a* and 6*b*. The main bearing 6*a* and 6*b* are angular contact ball bearings, for example.

The oil seal 105 is fitted onto the case 2 at the end that is on the opposite side in the axial direction to the electric motor 100, such that the inner circumferential surface of the case 2 meets the outer circumferential surface of the oil seal 105. The oil seal 105 is positioned further out in the axial direction than one of the two main bearings 6*a* and 6*b* that is distant in the axial direction from the electric motor 100, i.e., the first main bearing 6*a*. The oil seal 105 seals between the case 2 and the carrier 3.

<Carrier>

The carrier 3 has a disc-shaped base plate 7 and a disc-shaped end plate 8 facing each other in the axial direction, and three pillars 9 protruding from the base plate 7 toward the end plate 8. The pillars 9 are equally spaced in the circumferential direction. The end plate 8 is in contact with tips 9*a* of the pillars 9. The end plate 8 is secured to the pillars 9 by means of bolts 10. A space with a certain width in the axial direction is thus created between the base plate 7 and the end plate 8. A pin 11 is disposed in a portion of each pillar 9 that is located inside the bolt 10 in the radial direction. The pins 11 are used to place the end plate 8 at an intended position relative to the base plate 7. The pins 11 are fitted into pin holes 12*a* in the base plate 7 and into pin holes 12*b* in the end plate 8.

The outer circumferential surface of the base plate 7 and the outer circumferential surface of the end plate 8 are rotatably supported by the case 2 via the main bearings 6*a* and 6*b*, respectively. The inner circumferential surface of the oil seal 105 is fitted onto a portion of the outer circumferential surface of the base plate 7 that is located on the opposite side to the electric motor 100 with respect to the first main bearing 6*a*. This means that the oil seal 105 seals between the case 2 and the carrier 3 at a site further out in the axial direction than the first main bearing 6*a*.

The base and end plates 7 and 8 respectively have shaft insertion holes 7*a* and 8*a* at the center in the radial direction. The two shaft insertion holes 7*a* and 8*a* are arranged on the same axis. Of the two shaft insertion holes 7*a* and 8*a*, the shaft insertion hole 7*a* in the base plate 7 is closed by a seal cap 20. The base plate 7 has three crank insertion holes 7*b*, and the end plate 8 has three crank insertion holes 8*b*. The crank insertion holes 7*b* and 8*b* are arranged between adjacent ones of the pillars 9 in the circumferential direction. Furthermore, each of the crank insertion holes 7*b* and a corresponding one of the crank insertion holes 8*b* are arranged on the same axis. Therefore, a central axis A2 of each crank insertion hole 7*b* and the corresponding crank insertion hole 8*b* that face each other in the axial direction is parallel to the first rotation axis A1. Each of the crank insertion holes 7*b* and 8*b* receives therein a crank bearing 18. The crank bearings 18 are, for example, tapered roller bearings.

<Reduction Mechanism>

The reduction mechanism 4 causes the carrier 3 to rotate at a rotational speed that is reduced by a certain ratio from the rotational speed of the input shaft 101. The reduction mechanism 4 has three crankshafts 13, transmission spur gears 14 provided on the crankshafts 13 at their end in the axial direction, and two oscillating external gears 15 and 16 provided between the base plate 7 and the end plate 8. The three crankshafts 13 are inserted through the crank insertion holes 7*b* and 8*b* and rotatably supported by the carrier 3 (the base and end plates 7 and 8) via the crank bearings 18.

The transmission spur gears 14 have external teeth 17 on their outer periphery. The external teeth 17 mesh with external teeth 102 on the input shaft 101. As the external teeth 17 mesh with the external teeth 102, the rotation of the input shaft 101 is transmitted to the transmission spur gears 14, causing the transmission spur gears 14 to rotate.

Each of the crankshafts 13 has a shaft body 13*c* configured to rotate on the central axis A2, and a first eccentric portion 13*a* and a second eccentric portion 13*b* formed on the shaft body 13*c* at the middle portion in the axial direction. The portions of the shaft body 13*c* that face each other in the axial direction are rotatably supported by the carrier 3 (the base and end plates 7 and 8) via the crank bearings 18. At the end of the shaft body 13*c* in the axial direction, the transmission spur gear 14 is provided. The shaft body 13*c* and the transmission spur gear 14 are arranged on the same axis and integrated. Therefore, the crankshaft 13 and transmission spur gear 14 rotate on the central axis A2 as a single component. Hereinafter, the central axis line A2 is referred to as a second rotation axis A2 of the crankshaft 13.

The first and second eccentric portions 13*a* and 13*b* are arranged such that their center is shifted from the second rotation axis A2. The first and second eccentric portions 13*a* and 13*b* are positioned between the two crank bearings 18 and adjacent to the two crank bearings 18 in the axial direction. In other words, the first and second eccentric portions 13*a* and 13*b* are positioned adjacently to each other between the base plate 7 and the end plate 8 in the axial direction. The first and second eccentric portions 13*a* and 13*b* are 180 degrees out of phase. The eccentric portions 13*a* and 13*b* respectively have the inner circumferential surfaces of the roller bearings 19 fitted thereon. The roller bearings 19 are, for example, cylindrical roller bearings. The first and second oscillating external gears 15 and 16 are rotatably supported on each crankshaft 13 via the roller bearings 19.

The first and second oscillating external gears 15 and 16 are disposed in the space between the base plate 7 and the end plate 8. The first and second oscillating external gears 15 and 16 respectively have through holes 15*a* and 16*a*, where the outer circumferential surfaces of the roller bearings 19 are fittingly received. With such arrangement, as the crankshafts 13 rotate, the first and second eccentric portions 13*a* and 13*b* oscillatorily rotate, which causes the first and second oscillating external gears 15 and 16 to oscillatorily rotate via the roller bearings 19.

The first and second oscillating external gears 15 and 16 have openings 15*b* and 16*b*, respectively, to avoid interfering with the pillars 9. The first and second oscillating external gears 15 and 16 respectively have shaft insertion holes 15*c* and 16*c* at the center in the radial direction. The first and second oscillating external gears 15 and 16 respectively have on their outer circumference external teeth 15*d* and 16*d*, respectively. The number of external teeth 15*d* is less than the number of internal tooth pins 5 of the case 2 by one, and so is the number of external teeth 16*d*.

With such arrangement, as the first and second oscillating external gears 15 and 16 oscillatorily rotate, some of the external teeth 15*d* and 16*d* of the oscillating external gears 15 and 16 mesh with the internal tooth pins 5 of the case 2. The number of external teeth 15*d* is, for example, one less than the number of internal tooth pins 5, and so is the number of external teeth 16*d*. Therefore, the engagement of the external teeth 15*d* and 16*d* with the internal tooth pins 5 (case 2) sequentially moves in the circumferential direction while the oscillating external gears 15 and 16 rotate on their own axis. The rotation of the oscillating external gears 15 and 16 on their own axis is at a lower speed than the rotation of the crankshafts 13.

As the oscillating external gears 15 and 16 rotate, the crankshafts 13 rotate on the second rotation axis A2 while revolving around the first rotation axis A1. The crankshafts 13 are rotatably supported by the carrier 3 (the base and end plates 7 and 8). Therefore, the revolving of the crankshafts 13 around the first rotation axis A1 causes the carrier 3 to rotate. The speed reducer 1 thus reduces the rotation of the input shaft 101 and outputs the reduced rotation through the carrier 3. In an alternative case where the carrier 3 is stationary, the speed reducer 1 can reduce the rotation of the input shaft 101 and output the reduced rotation through the case 2.

The interior space within the case 2 is filled with a lubricant, not shown, to lower the frictional resistance in the carrier 3 and reduction mechanism 4 or to prevent a temperature rise. The measuring device 30 detects lubricant leakage from the interior space of the case 2. The measuring device 30 also detects whether the interior space is filled with an appropriate amount of lubricant.

<Measuring Device>

The measuring device 30 has a bottomed cylindrical housing 31 covering the case 2 from the electric motor 100 side, a pressure sensor 32 and a temperature sensor 33 installed on the housing 31, and a control unit 34 for receiving signals output from the pressure sensor 32 and temperature sensor 33. The housing 31 is arranged with its opening 31*a* facing the case 2. The opening 31*a* of the housing 31 is fitted onto the outer circumferential surface of the case 2 at a portion that is located between the electric motor 100 and the outer flange 2*a*. An O-ring 104 is provided on this site where the opening 31*a* is fitted.

The O-ring 104 seals between the case 2 and the housing 31. The housing 31 and the portion of the case 2 onto which the housing 31 is fitted define a measurement chamber 40 that is shut out from the ambient air outside the case 2. Unlike between the base plate 7 and the case 2, no oil seal or other sealing materials are provided between the end plate 8, which faces the measurement chamber 40, and the case 2. In addition, the shaft insertion hole 8*a* in the end plate 8 is provided with no sealing cap. The measurement chamber 40 is thus in communication with the internal space of the case 2. In other words, the measurement chamber 40 is in communication with the interior and exterior spaces of the case 2, and shut out from the ambient air outside the case 2.

The bottom wall 31*b* of the housing 31 has at the center in the radial direction a through hole 35 into which the input shaft 101 is inserted. The bottom wall 31*b* of the housing 31 has a cylindrical motor base 36 surrounding the through hole 35. The bottom wall 31*b* and the motor base 36 are shaped as a single component. The motor base 36 protrudes from the bottom wall 31*b* toward the electric motor 100. The end of the motor base 36 (facing the electric motor 100) has internally threaded portions 36*a*. With such arrangement, the electric motor 100 is placed on the motor base 36, and bolts 106 are tightened into the internally threaded portions 36*a* from above a flange 100*a* of the electric motor 100. This leads to securing the electric motor 100 to the housing 31. Between the motor base 36 and the flange 100*a* of the motor, an O-ring is disposed to provide a seal, although not shown.

The pressure sensor 32 is disposed on the bottom wall 31*b* of the housing 31. The pressure sensor 32 detects the pressure in the measurement chamber 40 and outputs the detected result to the control unit 34 as a signal. The temperature sensor 33 is constituted by, for example, an RFID tag 37 with a built-in temperature sensor. The temperature sensor 33 includes the RFID tag 37 and an RFID reader 38. The RFID tag 37 is provided at the end of the shaft body 13*c* of each crankshaft 13 that is exposed to the measurement chamber 40. The RFID tag 37 transmits the detected temperature as a signal. The RFID reader 38 is located on the bottom wall 31*b* of the housing 31. The RFID reader 38 receives the signal transmitted from the RFID tag 37 and further outputs the received signal to the control unit 34.

The control unit 34 has a table 39 that is referred to in order to detect the lubricant leakage from the interior space of the case 2 based on the signal input from the pressure sensor 32 and the signal input from the temperature sensor 33 (RFID reader 38). The control unit 34 may be connected to the pressure sensor 32 and temperature sensor 33 (RFID reader 38) in a wired or wireless manner.

Figure 2:
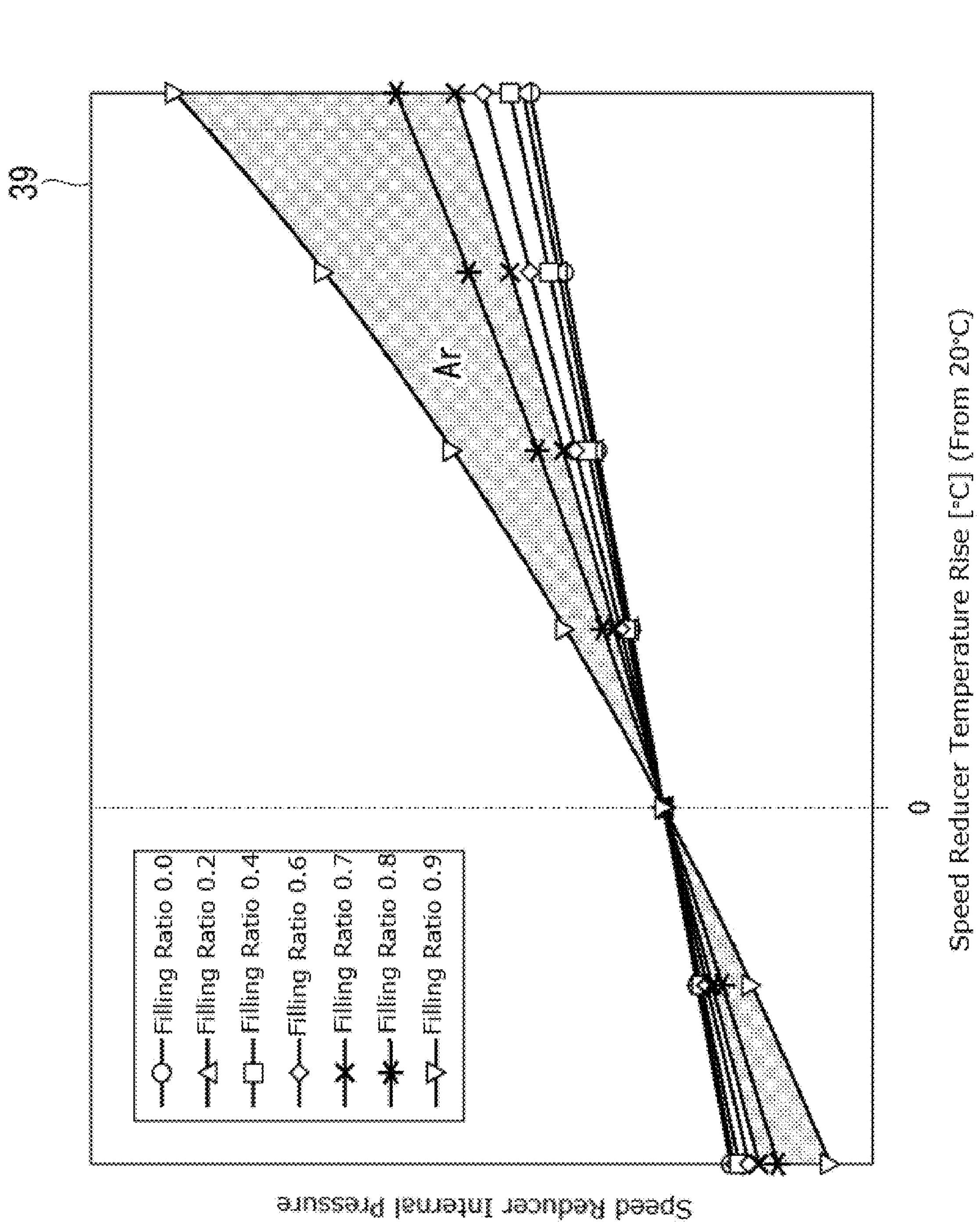
FIG. 2 shows a table for a control unit relating to the embodiment of the present disclosure.

FIG. 2 shows the table 39 in the control unit 34. As shown in FIG. 2, the table 39 is a graph showing how the pressure inside the speed reducer 1 changes, with the pressure inside the speed reducer 1 (Speed reducer Internal Pressure) being plotted along the vertical axis and the temperature rise in the speed reducer 1 (Speed Reducer Temperature Rise) being plotted along the horizontal axis. The table 39 has lines corresponding to respective values of the ratio of the lubricant inside the speed reducer 1 (hereinafter simply referred to as the lubricant filling ratio), which all indicate how the pressure inside the speed reducer 1 changes.

The horizontal axis of the table 39 represents the temperature rise from 20° C. Stated differently, the value "0° C." on the horizontal axis means a temperature rise of 0° C. from 20° C. The pressure inside the speed reducer 1 means the pressure inside the case 2. Since the interior space of the case 2 is in communication with the measurement chamber 40, the pressure inside the case 2 is equal to the pressure in the measurement chamber 40. Therefore, detecting the pressure in the measurement chamber 40 by the pressure sensor 32 is equivalent to detecting the pressure inside the case 2 by the pressure sensor 32. The lubricant filling ratio represents the ratio of the lubricant to the sum of the volume inside the case 2 and the volume inside the measurement chamber 40 (hereinafter the sum is simply referred to as the total volume).

The following explains how the condition of the lubricant inside the case 2 is related to the lubricant leakage from the interior space of the case 2 and describes a change in the lubricant filling ratio. The following first describes how the speed reducer 1 behaves if the lubricant leaks from the interior space of the case 2 and how the control unit 34 monitors the condition of the lubricant inside the case 2. The measurement chamber 40, which is defined by the measurement device 30, is in communication with the interior space of the case 2. Therefore, the lubricant leakage from the interior space of the case 2 is specifically defined as the lubricant leakage from the interior space of the case 2 to the outside through the oil seal 105 and seal cap 20. If such occurs, the volume of the case 2 increases as much as the lubricant leaks, resulting in a drop in pressure inside the case 2, and in the measurement chamber 40.

As the temperature of the lubricant rises, the lubricant expands. As a result, the volume inside the case 2 decreases, so that the pressure inside the case 2, and in the measurement chamber 40, increases. The control unit 34 refers to the signal input from the pressure sensor 32 and the signal input from the temperature sensor 33 (RFID reader 38) while taking the above-mentioned relations into the consideration, and determines that the lubricant has leaked if the pressure in the measurement chamber 40 suddenly drops while the temperature of the lubricant remains the same.

The following now describes a change in the lubricant filling ratio, as well as how the control unit 34 monitors the condition of the lubricant inside the case 2. The change in pressure inside the case 2, and in the measurement chamber 40 that is caused by the change in temperature depends on the lubricant filling ratio. It is preferred that the lubricant filling ratio is generally in the range of 0.7 to 0.9. Therefore, the region Ar (see the shaded area in FIG. 2) in the table 39 that is delineated by the lines corresponding to the lubricant filling ratio of 0.7 to 0.9 is the proper range. The region Ar is hereinafter defined as the proper region Ar.

The control unit 34 compares the signal input from the pressure sensor 32 and the signal input from the temperature sensor 33 (RFID reader 38) against the table 39, to estimate the lubricant filling ratio. If the estimated lubricant filling ratio falls within the proper region Ar, the control unit 34 determines that the case 2 is filled with an appropriate amount of lubricant. If the estimated lubricant filling ratio does not fall within the proper region Ar, the control unit 34 determines that the case 2 is not filled with an appropriate amount of lubricant.

The control unit 34 may be also configured to determine that the lubricant has leaked if the pressure inside the speed reducer 1 is lower than the proper region Ar. The following now studies the contrary case where the pressure inside the speed reducer 1 is higher than the proper region Ar. In such a case, the initial filling ratio that is reached by introducing the lubricant into the speed reducer 1 during the assembly of the speed reducer 1 is highly likely to be at an inappropriate level. The measuring device 30 monitors the condition of the lubricant in order to detect the lubricant leakage or to determine whether the case 2 is filled with an adequate amount of lubricant.

Although the initial lubricant filling ratio may be at an appropriate level, the pressure inside the speed reducer 1 may still become higher than the proper region Ar after the speed reducer 1 starts operating. In this case, the high pressure may be attributable not to the lubricant leakage but to an abnormal pressure inside the speed reducer 1 or abnormalities occurring in the sensors 32 and 33. These abnormalities can be also detected by the control unit 34.

The following now describes how to calculate the lines for the respective values of the lubricant filling ratio shown in the table 39. The following values are involved.

Total volume: V1
Lubricant volume: V2
Volume of air (gas) inside case 2 and measurement chamber 40: V3
Lubricant filling ratio: A
Temperature change: Δt
Body expansion rate of lubricant: N [$\times 10^{-3}$/° C.]
Linear expansion coefficient of case 2 and housing 31 (e.g., cast iron): M [$\times 10^{-6}$/° C.]
Atmospheric pressure: B (0.101325 [Mpa])

Here, the volume V3 satisfies the following equation.

$$V3 = V1(1-A) \quad \text{Equation (1)}$$

The total volume V1' resulting from the temperature change Δt satisfies the following equation.

$$V1' = V1(1+3\times M\times \Delta t) \quad \text{Equation (2)}$$

The lubricant volume V2' resulting from the temperature change Δt satisfies the following equation.

$$V2' = V1\times A(1+N\times \Delta t) \quad \text{Equation (3)}$$

From the above equations (2) and (3), the volume V3' satisfies the following equation.

$$V3' = V1' - V2' = V1\{(1+3\times M\times \Delta t) - A(1+N\times \Delta t)\} \quad \text{Equation (4)}$$

If the temperature change Δt is a positive value, the lubricant expands, thereby raising the air pressure and reducing the volume. If the temperature change Δt is a negative value, the lubricant shrinks, thereby lowering the air pressure and increasing the volume. Here, Boyle-Charles' law can be applied to study the air (gas) in such an enclosed space. That is, the following equation is satisfied.

$$P \times V / T = \text{Constant} \quad \text{Equation (5)}$$

Here, P, V and T respectively denote the pressure, volume and absolute temperature.

Applying this to the temperature rise (Δt) from the temperature during the assembly of the speed reducer 1 (room temperature T, atmospheric pressure B) to the temperature during the driving of the speed reducer 1, the following equation (6) is obtained.

$$\{B \times V1 \times (1 - A)\}/T = [P \times V1\{(1 + 3 \times M \times \Delta t) - A(1 + N \times \Delta t)\}]/(T + \Delta t) \quad \text{Equation (6)}$$

By rearranging the equation (6) for the pressure P, the following equation (7) can be obtained to determine the pressure P inside the speed reducer 1.

$$P = \{B \times V1 \times (1 - A) \times (T + \Delta t)\}/[T\{(1 + 3 \times M \times \Delta t) - A(1 + N \times \Delta t)\}] \quad \text{Equation (7)}$$

As described above, the lubricant filling amount can be accurately estimated based on the correlation between the temperature change Δt and the pressure P inside the speed reducer 1. It is, however, also possible to determine whether the lubricant has leaked from the interior space of the case 2 based solely on the detected results from the pressure sensor 32, for example. Specifically, it can be determined that the lubricant has leaked from the interior space of the case 2 if, for example, the pressure inside the measurement chamber 40 drops suddenly.

The speed reducer 1 relating to the present embodiment has: the measurement chamber 40 in communication with the interior and exterior spaces of the case 2, the measurement chamber 40 being shut out from the ambient air outside the case 2; the pressure sensor 32 configured to detect the pressure inside the measurement chamber 40; and the control unit 34 configured to detect the lubricant leakage from the interior space of the case 2 based on a detected result by the pressure sensor 32. The speed reducer 1 can thus monitor the condition of the lubricant inside the case 2 immediately and accurately. For example, the speed reducer 1 can detect the lubricant leakage. Based on the monitored results, the speed reducer 1 can keep the condition of the lubricant, for example, the filling amount, at a proper level. The speed reducer 1 requires no external large-scale measuring devices, thereby avoiding an increase in size.

To define the measurement chamber 40, the speed reducer 1 has the housing 31, separate from the case 2. Therefore, no processing needs to be performed on the case 2, for example, to install the measuring device 30. The measurement chamber 40 and pressure sensor 32 can be retrofitted to the existing speed reducer 1. The measurement chamber 40, which is shut out from the ambient air outside the case 2, is defined by the housing 31 and the portion of the case 2 to which the housing 31 is fitted. The housing 31 can be thus simplified, and the speed reducer 1 can more effectively avoid an increase in size.

The measuring device 30 includes the temperature sensor 33 in addition to the pressure sensor 32. The control unit 34 detects the lubricant leakage from the interior space of the case 2 based on the signal input from the pressure sensor 32 and the signal input from the temperature sensor 33. Since the temperature sensor 33 can detect the temperature of the site exposed to the measurement chamber 40, the control unit 34 can thus detect the lubricant leakage based additionally on the thermal expansion of the lubricant. The control unit 34 can accordingly detect the lubricant leakage more accurately.

The control unit 34 has the table 39 that associates the temperature rise from the reference temperature at the site exposed to the measurement chamber 40 and the pressure inside the measurement chamber 40. The control unit 34 compares the signals input from the pressure and temperature sensors 32 and 33 against the table 39, to estimate the lubricant filling ratio. Based on the estimated result, the control unit 34 may determine that the lubricant filling amount is not at a proper level. In this case, it is possible to immediately control the lubricant filling amount to achieve a proper level. As a result, the speed reducer 1 can prevent malfunctions.

The table 39 can also be used to immediately detect the lubricant leakage. The table 39 makes it easy to determine whether the lubricant leaking amount is so significant that the speed reducer 1 needs to be filled with additional lubricant. Furthermore, it is also possible to determine whether or not the lubricant filling amount at the time of assembly of the speed reducer 1 is at a proper level. For the reasons stated above, depending on the lubricant leaking and/or filling amount, the speed reducer 1 can be appropriately handled.

In addition, the RFID tag 37 of the temperature sensor 33 is disposed on the end of the shaft body 13*c* of each crankshaft 13 that is exposed to the measurement chamber 40. As the temperature is measured at the portion of the reduction mechanism 4 that is in direct contact with the lubricant and that is exposed to the measurement chamber 40, accurate correlation can be established between the temperature change Δt and the pressure P inside the speed reducer 1, which is shown in the table 39. Therefore, the lubricant leakage can be detected even more accurately.

<Variation>

In the embodiment described above, the speed reducer 1 has the housing 31 separate from the case 2 to define the measurement chamber 40. The embodiment, however, is not limited to such. The speed reducer 1 may be embodied without the housing 31 as long as the measurement chamber 40 can be formed that is in communication with the interior and exterior spaces of the case 2 and that is shut out from the ambient air outside of the case 2. This alternative may be specifically described in the following.

Figure 3:
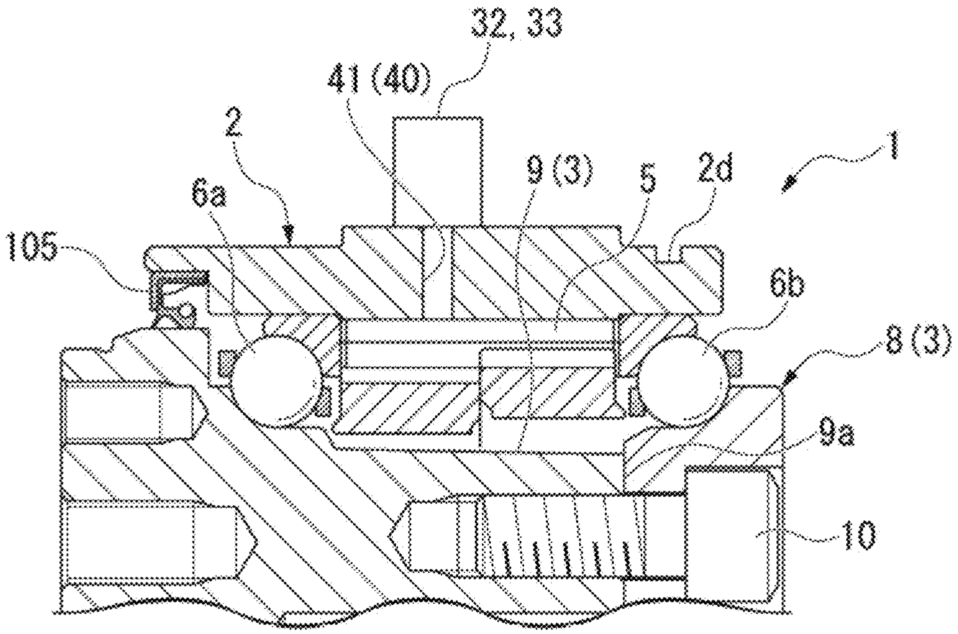
FIG. 3 is an enlarged sectional view showing a portion of a speed reducer relating to a variation of the embodiment of the present disclosure.

FIG. 3 is an enlarged sectional view showing a portion of a variation of the speed reducer 1. As shown in FIG. 3, the case 2 has a through hole 41 in communication with the interior and exterior spaces of the case, and the through hole 41 may be used as the measurement chamber 40. The pressure and temperature sensors 32 and 33 can be installed in the through hole 41. The pressure and temperature sensors 32 and 33 may be provided to block the through hole 41, so that the through hole 41 may be shut out from the ambient air. The through hole 41 may be closed with a sealing cap or the like, not shown, to be shielded from the ambient air.

The embodiment described herein are not intended to necessarily limit the present invention to any specific embodiments. Various modifications can be made to the embodiment without departing from the true scope and spirit of the present invention.

For example, in the foregoing embodiment, the speed reducer 1 is described as an example of the gear device. The speed reducer 1 relating to the foregoing embodiment is an eccentric oscillation speed reducer. The reduction mechanism 4 is described as an example of the transmission mechanism. The present embodiment is, however, not limited to such. The transmission mechanism can be configured in any manner as long as it has a plurality of gears configured to rotate when acted upon by power from an external source outside the case 2. The measurement chamber 40, pressure sensor 32 and temperature sensor 33 can be applied to a variety of gear devices as long as they include the above-mentioned transmission mechanism.

In the embodiment described above, the speed reducer 1 includes three crankshafts 13. The three crankshafts 13 are configured to cause the oscillating external gears 15 and 16 to oscillatorily rotate. The embodiment, however, is not limited to such, and the speed reducer 1 may be configured in any other manners as long as it includes at least one crankshaft 13. For example, the speed reducer 1 can be a center crank speed reducer including a single crankshaft 13. In this case, the single crankshaft 13 is arranged on the first rotation axis A1 and configured to cause the oscillating external gears 15 and 16 to oscillatorily rotate.

In the speed reducer 1 relating to the foregoing embodiment, the pillars 9 of the carrier 3 protrude from the base plate 7. The embodiment, however, is not limited to such, and the pillars 9 may not be integrated with the base plate 7. In this case, the pillars 9 are secured onto the base plate 7 by means of, for example, bolts, like the end plate 8. The pillars 9 can be shaped in any manners as long as they can define a space with a certain width in the axial direction between the base plate 7 and the end plate 8.

In the embodiment described above, the lubricant filling ratio denotes the ratio of the lubricant to the total volume, which is the sum of the volume of the interior space of the case 2 and the volume of the interior space of the measurement chamber 40. The embodiment, however, is not limited to such, and the lubricant filling ratio may denote the ratio of the lubricant to only the volume of the interior space of the case 2. In this alternative case, the values of the filling ratio in the table 39 are accordingly adapted.

In the embodiment described above, the measurement chamber 40 is formed by the combination of the case 2 and housing 31. In the variation described above, the case 2 has the through hole 41, which serves as the measurement chamber 40. The present disclosure, however, is not limited to such. The measurement chamber 40 may be formed solely by the housing 31. The housing 31 may be box-shaped, for example, so that its internal space can serve as the measurement chamber 40. A portion of the housing 31 may be in communication with the interior space of the case 2.

In the embodiment described above, the temperature sensor 33 includes the RFID tag 37 and RFID reader 38. The RFID tag 37 is provided on the end of the shaft body 13*c* of each crankshaft 13 that is exposed to the measurement chamber 40. The embodiment, however, is not limited to such. The temperature sensor 33 may be configured in any other manners as long as it can detect the temperature of the site exposed in the measurement chamber 40. Specifically, the RFID tag 37 can be attached directly to the speed reducer 1, or mounted on the inner surface of the housing 31. The temperature sensor should not be exposed to the ambient air. The temperature sensor 33 can be either contact- or non-contact-type. The temperature sensor may be configured to be inserted into the measurement chamber 40.

In the embodiment described above, the measuring device 30 includes the temperature sensor 33 in addition to the pressure sensor 32. According to the above description, the control unit 34 detects the lubricant leakage from the interior space of the case 2 based on the signal input from the pressure sensor 32 and the signal input from the temperature sensor 33. The control unit 34 has the table 39 that associates the values of the temperature rise from the reference temperature at the site exposed to the measurement chamber 40 with the pressure inside the measurement chamber 40.

The embodiment, however, is not limited to such. The measuring device 30 can be configured in any other manners as long as it includes at least the pressure sensor 32 and is configured to detect the lubricant leakage from the interior space of the case 2 based on the detected results by the pressure sensor 32. The control unit 34 may not have the table 39. Even in this alternative case, the speed reducer 1 can still immediately and accurately detect the lubricant leakage. The speed reducer 1 requires no external large-scale measuring device and can thus avoid an increase in size.

In the above embodiment, the electric motor 100 is described as an example of the source of the power fed from outside the case 2. The embodiment, however, is not limited to such, and any arrangement can be employed as long as they can provide power to the reduction mechanism 4. For example, the electric motor 100 may be replaced with a hydraulic motor, an engine, etc.

In the embodiment described above, the values of the temperature rise in the speed reducer 1, which are plotted along the horizontal axis of the table 39, are calculated based on the temperature of 20° C. The embodiment, however, is not limited to such, and the reference temperature can be set at any level. For example, the reference temperature may be set at 30° C. In this case, the value "0° C." on the horizontal axis means a temperature rise of 0° C. from 30° C. Changing the reference value results in changing the lines corresponding to the various values of the lubricant filling ratio from those obtained with the reference temperature being set at 20° C.

In the embodiment described above, the region Ar in the table 39 that is delineated by the lines corresponding to the lubricant filling ratio of 0.7 to 0.9 is the proper range. The speed reducer 1 may determine that the lubricant has leaked if the pressure inside the speed reducer 1 is lower than the proper region Ar. The embodiment is, however, not limited to such. The values outside the proper region Ar do not necessarily mean the lubricant leakage. For example, those values may result from contamination or damages in the reduction mechanism 4. Therefore, the control unit 34 only estimates the lubricant ratio base on the table 39 and determines whether the lubricant filling amount is at a proper level base on the estimated result.

The foregoing embodiment disclosed herein describes a plurality of physically separate constituent parts. They may be combined into a single part, and any one of them may be divided into a plurality of physically separate constituent parts. Irrespective of whether or not the constituent parts are integrated, they are acceptable as long as they are configured to attain the object of the invention.

What is claimed is:

1. A gear device comprising:

a case;

a transmission mechanism housed inside the case along with a lubricant, the transmission mechanism including a plurality of gears configured to rotate when acted upon by power from outside the case;

a measurement chamber in communication with interior and exterior spaces of the case, the measurement chamber being shut out from ambient air outside the case;

a pressure sensor configured to detect pressure inside the case that houses the transmission mechanism and the lubricant;

a processor configured to monitor a condition of the lubricant inside the case;

a housing separate from the case, the housing defining the measurement chamber in communication with the interior space of the case; and a temperature sensor disposed in the measurement chamber that is defined by a portion of the case and the housing, the temperature sensor being configured to detect temperature of a site that is exposed to the measurement chamber and is a portion of the transmission mechanism being in contact with the lubricant, wherein the processor is configured to detect leakage of the lubricant from the interior space of the case based on a change in a correlation between the temperature of the portion of the transmission mechanism, being in contact with the lubricant, detected by the temperature sensor and the pressure inside the case, which houses the transmission mechanism and the lubricant, detected by the pressure sensor.

2. The gear device of claim 1, wherein a memory of the processor stores a table associating values of a temperature rise from a reference temperature at the site exposed to the measurement chamber with the pressure inside the measurement chamber, wherein the processor is configured to compare the detected result by the temperature sensor and the detected result by the pressure sensor against the table to estimate a ratio of the lubricant to a total volume that is a sum of a volume of the interior space of the case and a volume of the measurement chamber, and determine whether a filling amount of the lubricant is at a proper level based on an estimated result.

3. The gear device of claim 2, wherein the memory stores the table associating the values of the temperature rise with the pressure, for each of a plurality of ratios of the lubricant to the total volume, and wherein the processor is configured to estimate the ratio of the lubricant to the total volume by referring to the table based on a combination of the detected result by the temperature sensor and the detected result by the pressure sensor, and determine whether the filling amount of the lubricant is at the proper level based on whether the estimated ratio of the lubricant falls within a range corresponding to predetermined ratios among the plurality of ratios.

4. The gear device of claim 2, wherein the memory stores the table associating the values of the temperature rise with the pressure, for each of a plurality of ratios of the lubricant to the total volume, and a proper range, which includes combinations of the values of the temperature rise and the pressure based on the table, corresponding to specified ratios of the lubricant, and wherein the processor is configured to determine whether the filling amount of the lubricant is at the proper level, based on whether a detected combination of the detected result by the temperature sensor and the detected result by the pressure sensor falls within the proper range.

5. The gear device of claim 4, wherein the processor is configured to estimate the condition of the lubricant by comparing the combinations of the values of the temperature rise and the pressure within the proper range based on the table, and the detected combination of the detected result by the temperature sensor and the detected result by the pressure sensor, in a case where the detected combination does not fall within the proper range.

* * * * *